(12) United States Patent
Luzzatto

(10) Patent No.: US 6,452,606 B1
(45) Date of Patent: Sep. 17, 2002

(54) METHOD AND APPARATUS FOR RECORDING AND REPRODUCING COMPUTER POINTER OUTPUTS AND EVENTS

(76) Inventor: Marco Luzzatto, 33 Betzalel Street, 64683 Tel Aviv (IL)

(*) Notice: Subject to any disclaimer, the term of this patent is extended or adjusted under 35 U.S.C. 154(b) by 0 days.

(21) Appl. No.: 09/367,515

(22) PCT Filed: Feb. 9, 1998

(86) PCT No.: PCT/IL98/00061

§ 371 (c)(1),
(2), (4) Date: Aug. 13, 1999

(87) PCT Pub. No.: WO98/36404

PCT Pub. Date: Aug. 20, 1998

(30) Foreign Application Priority Data

Feb. 13, 1997 (IL) ................................................ 120213

(51) Int. Cl.[7] ................................................ G06F 3/00
(52) U.S. Cl. ........................ 345/704; 345/700; 345/764; 345/157
(58) Field of Search ................................ 345/704, 700, 345/856, 858, 764, 808, 809, 835, 810, 841, 157, 163; 434/118

(56) References Cited

U.S. PATENT DOCUMENTS

| | | | |
|---|---|---|---|
| 4,859,995 A | 8/1989 | Hansen et al. | 345/163 |
| 5,086,393 A * | 2/1992 | Kerr et al. | 434/118 |
| 5,153,571 A | 10/1992 | Takahashi | 345/163 |
| 5,239,654 A * | 8/1993 | Ing-Simmons et al. | 712/20 |
| 5,367,631 A | 11/1994 | Levi | 345/163 |
| 5,392,400 A | 2/1995 | Berkowitz | 709/203 |
| 5,408,602 A | 4/1995 | Giokas | 345/733 |
| 5,463,769 A * | 10/1995 | Tate et al. | 709/315 |
| 5,487,084 A | 1/1996 | Lindholm | 375/215 |
| 5,530,455 A | 6/1996 | Gillick et al. | 345/163 |
| 5,634,100 A * | 5/1997 | Capps | 705/9 |
| 5,680,639 A * | 10/1997 | Milne et al. | 707/500.1 |
| 5,694,150 A | 12/1997 | Sigona | 345/806 |
| 5,706,505 A * | 1/1998 | Fraley | 395/614 |
| 5,758,195 A * | 5/1998 | Balmer | 712/300 |
| 5,760,764 A | 6/1998 | Martinelli | 345/160 |
| 5,781,188 A * | 7/1998 | Amiot et al. | 345/723 |
| 5,786,814 A * | 7/1998 | Moran et al. | 345/720 |
| 5,832,299 A * | 11/1998 | Wooten | 710/9 |
| 5,838,321 A * | 11/1998 | Wolf | 345/803 |
| 5,945,979 A | 8/1999 | Rutledge | 345/161 |

* cited by examiner

Primary Examiner—Raymond J. Bayerl
Assistant Examiner—Cuong T. Thai
(74) Attorney, Agent, or Firm—Lerner, David, Littenberg, Krumholz & Mentlik, LLP

(57) ABSTRACT

Processes and apparatus for recording and reproducing computer pointer outputs are provided. The process comprises choosing one of the R/M or A/P modes, and when the pointer is in the R/M mode, identifying the beginning of the pointer output, registering subsequent pointer events, identifying the end of pointer output, and ceasing to register successive pointer events, and when the pointer is in the A/P mode, causing the events of selected pointer output to be repeated.

10 Claims, 7 Drawing Sheets

FIG. 1A

EFGHABCD

㉒ ㉓
㉔ ㉕

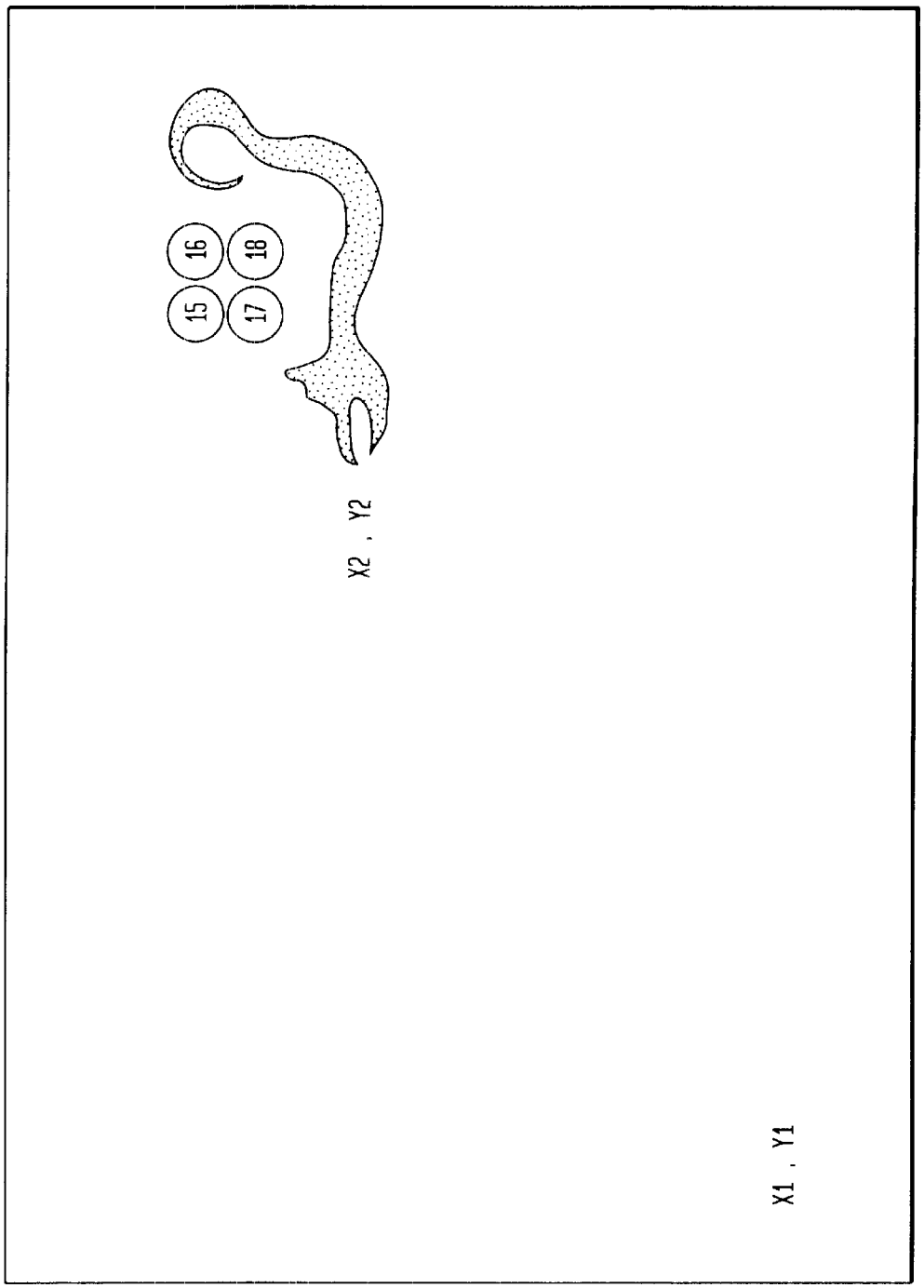

METHOD AND APPARATUS FOR RECORDING AND REPRODUCING COMPUTER POINTER OUTPUTS AND EVENTS

FIELD OF THE INVENTION

This invention refers to improvements in pointer-controlled computer operations, and more specifically, to means for causing a computer to repeat a desired operation or series of operations by a reduced number of commands or by a single command, without interfering with the computer software. In particular, it refers to means for causing a computer to repeat the transfer of print or graphic elements from one zone of the computer screen to another or for reproducing designs in any such zone, as well as for creating pointer commands that are not available in the computer toolbars or menus.

BACKGROUND OF THE INVENTION

Patent application PCT/IL96/00078, the contents of which are entirely incorporated herein by reference, describes improvements in pointer devices for operating computers in computer operation processes and in apparatus comprising computers and pointer devices.

In particular, it discloses a method of operating a pointer controlled computer, which comprises the following steps:

A—Choosing one of two Modes, the RIM (REGISTER/MEMORY) Mode or the A/P (ACTIVE/PLAY) Mode;

B—When the pointer is in the R/M Mode: a) selecting at least an operation unit, as hereinbefore defined, by bringing the pointer index to a reference position corresponding to said operation unit; and b) causing the pointer index coordinate displacements relative to said reference position and a fist, selected base point to be counted and registered or memorized as differential coordinate displacements;

C—When the pointer is in the A/P Mode: a) selecting an operation unit from among those previously selected in the R/M Mode; b) determining the corresponding counter coordinates, as hereinbefore defined, of the reference position by applying the differential coordinate displacements, with the appropriate sign, to the counter coordinates of a second base point; and c) carrying out the operation unit corresponding to said reference counter coordinates.

Said PCT application also discloses pointer controlled computer apparatus, which comprises:

I—a pointer device, comprising means for producing and transmitting to a computer at least signals corresponding to pointer index displacements and other desired information and instructions;

II—a computer having means for receiving and means for processing signals from said pointer, said processing means comprising means for causing pointer index displacements and other operations directed by said signals to be performed;

III—means for identifying, among said signals, those corresponding to differential displacements;

IV—counter means for registering differential displacements;

V—means for reading and/or retrieving said differential displacements and determining from them reference counter coordinates; and VI—means for performing the operations corresponding to said reference counter coordinates.

The pointer to which said PCT application, as well as the present application, refers, may be, and often is, a mouse; however, it may be any kind of pointer, and therefore, while reference may be, made to a mouse for descriptive purposes, it should be remembered that what is said about a mouse extends to any computer controlling pointers, and, conversely, that the term "pointer" includes a mouse. It should also be remembered that a pointer is represented on the computer screen by a pointer index or cursor ("index" and "cursor" being herein synonymous) and what is seen by the computer operator is the positions and displacements of said index, so that, when pointer positions or displacements are mentioned herein. what is intended are the positions or displacements of the pointer index. In computer operation, the pointer index may assume different shapes depending on the computer software, in particular the arrow shape, the I-shape and the L- or equivalent shape, said shapes and their changes have a significance well known to all persons who use computers.

The smallest displacements that a pointer index can make along the X and Y axes, and the corresponding X-Y elementary vector displacements, will be called herein, as they are called in the aforesaid PCT/IL96/00078, "elementary" coordinate displacements or vector displacements, respectively. Their size depends on the particular pointer and especially on the particular system in which the pointer operates. In general, all coordinate displacements that are not elementary ones are algebraic sums of elementary coordinate displacements, and all vector displacements that are not elementary ones are vectorial sums of elementary vector displacements. It should be stressed that in this specification and claim the term "pointer" indicated the pointing device, while what is seen on the screen is "the pointer index or cursor". The method and apparatus of the aforesaid PCT application associate to any operation, or series of operations, the succession of pointer events which cause them to be carried out by the computer. According to it, two Modes are available in the pointer-computer device and in its operation: the R/M (REGISTER/MEMORY) Mode and the A/P (ACTIVE/PLAY) Mode. In the R/M Mode, successions of pointer events, required to cause an operation or series of operations to be performed by the computer, are registered and memorized in appropriate memory banks; in the A/P Mode, said successions are reproduced, and the corresponding operation or series of operations are caused to be performed by a single or a limited number of pointer events, regardless of how many such events were originally and are ordinarily required to achieve the same effect. The expression "pointer (mouse) event" is ordinarily used to mean the actuation of a pointer (or, in particular, mouse) key, or in general, any command given by means of a pointer, but in this specification and claims, it should be construed to further include any elementary X or Y displacement of the pointer or of the pointer index. More generally, a pointer event is the transmission of a message or code from the pointer to the computer, which message or code is generally a digital one, composed of a number of bits. The method and apparatus described in said PCT application permit, and in fact require, to register and memorize all pointer events—viz. the corresponding messages or codes—which are relevant for carrying out any desired computer operation and to "play", viz. reproduce those same successions of events as if they originated at the moment from the pointer, whenever desired to carry out once again the same operation or succession of operations. When said successions of events are so reproduced, the computer believes, so to speak, that they originate from the pointer, and reacts accordingly.

There are, however, a number of desirable improvements in computer operations that are not connected, or not directly connected, to the carrying out of specific operations, in particular, such operations as are displayed on the toolbars or menus of the computer. For example, in drawing operations, the pointer may be used to define what will be called a "design", viz. a geometric figure, a curve, a shaped surface or any regular or irregular graphic entity, on the computer screen. Some computer programs are capable of memorizing an approximation of the path which the pointer has followed in defining the design, by memorizing the positions of the pointer at certain time intervals and by approximately reproducing the design as defined by the points at which the pointer was located at said time intervals. In other words, the design is approximately memorized as a succession of segments, the length of which depends on the length of displacement of the pointer between the two successive times at which the position of the pointer has been memorized. It is apparent that in this way, the design is reproduced with an approximation that depends on the speed with which it has been generated by the pointer in its displacement. If the pointer has been moved fairly rapidly, the succession of segments will not adequately approximate the pointer path, and therefore the design itself and it will be necessary to generate it very slowly in order to reproduce it with reasonable accuracy. However, this is the best that present computer programs are capable of doing. It would be desirable to be able to reproduce graphic entities accurately, regardless of the speed with which. they are generated, and of their complexity. Further, it would be desirable to be able to reproduce a design in any chosen zone of the computer screen, even different from that in which the design has been generated. Present computer programs do not permit to so this.

Other operations are not displayed in computer toolbars or menus and are not connected with specific positions of the pointer index. An example is the displacement of a figure in graphic operations from one zone of the screen to another. An analogous example is the displacement of a portion of a script or the inversion of the order of a succession of characters or graphic entities. E.g., it may be desired to permute letters or other graphic entities, that have been generated in a given succession, to obtain a different succession, or to effect the same permutation on different such successions. With present computer software, the same, often long series of pointer events is required every time that this is to be done, whereas it would be desirable to reproduce the permutation, once it has been generated for the first time, in a quick and easy manner.

Still further, many operations afforded by present computer software, require the operator to learn and remember a complex operating procedure. This is neither easy nor convenient, and therefore many possibilities afforded by the software are not exploited and often are not known to the operators. It would be desirable to simplify such procedures.

While there are operations that are not displayed in a computer toolbar or menu, there are positions in such toolbars or menus that do not correspond to an operation, but oily enable a successive operation, that may be carried out or not, as the operator chooses.

Further, there are computer actions that require the actuation of pointer events, but are independent on tube position of the screen at which the events occur.

It is a purpose of this invention to permit all the most desirable improvements in pointer operation, as well as other improvements that will be evident to skilled persons, without in any way interfering with the computer software and without generating a dependence on any particular computer program.

It is another purpose to facilitate graphic operations and to permit their repetition in a simplified and quicker manner.

It is a still further purpose to facilitate operations that are not displayed in a computer toolbar or menu, or computer actions that involve choices or commands that only enable a successive operation, and to permit their repetition in a simplified and quicker manner.

It is a still further purpose to facilitate computer actions that are dependent on pointer events, but not on the position of the screen at which the events occur, and to permit their repetition in a simplified and quicker manner.

It is a still further purpose to create commands that are not comprised in the computer toolbars or menus and which are constituted by a succession of pointer events, and to permit their execution, whenever desired, by producing a single pointer event or a limited number of such events.

Hereinafter, a succession or series of pointer (mouse) events will be called "a pointer (mouse) output". An output may consist of any number, e or more, of events. The displacement of the pointer cursor over the screen, resulting from a plurality of elementary displacements, each of which is an event, represents in itself an output. A single elementary displacement along one coordinate axis is a "single-event pointer output". The computer, receiving the pointer output, will translate it to an action (simple or complex) which depends on the computer software. The computer system comprises instructions, generally stored in what is known as the "Service Library", which determine how the computer should act when it receives a pointer output. The sum total of these instructions will be called hereinafter "transfer operator", since it creates a correspondence between pointer outputs and computer actions. The action which the computer carries out in consequence of the application of the transfer operator to a given pointer output, will be called the action or the program response "associated" with that output, and, vice versa, the pointer output which gives rise, by the application of the transfer operator, to a given computer action or program response, will be called the output "associated" with that action or program response. It is understood that in some cases a pointer output causes no computer action, such being in general the case e.g. when a pointer key is depressed while the pointer index is located in a blank portion of the screen. It will be said in those cases that the transfer operator is the "zero operator" and that the associated action connected to such an output is a "zero action". The transfer operator depends on the computer, on the program which it uses, on the position of the pointer, and in some cases, on the pointer outputs and computer actions that have previously occurred It is in no way connected with the pointer hardware or software. In order to achieve its purposes, this invention must be computer- and software-independent, viz. must be, as to itself equally operative and effective no matter what the transfer operators, though its results may be and generally are influenced by the type of computer and its software.

SUMMARY OF THE INVENTION

The process according to the invention comprises the following steps:

A—Choosing one of two Modes, the R/M (REGISTER/MEMORY) Mode or the A/P (ACTIVE/PLAY) Mode;

B—When the pointer is in the R/M Mode: a) identifying the beginning of a pointer output, b) registering all the pointer events occurring thereafter, c) identifying the end of the pointer output, and d) ceasing to register any successive pointer events;

C—When the pointer is in the A/P Mode, causing the events comprised in the selected pointer output to be repeated.

Obviously, the transfer operators included in the computer software will react to the repeated pointer events and outputs in the same manner in which they reacted when said events and outputs occurred for the first time, and in both cases the computer will carry out the action associated with said events and outputs.

In preferred embodiments of the invention, the above operations may be carried out on a number of pointer outputs. In that case, when the pointer is in the R/M Mode, one of the possible pointer outputs will be selected at the beginning of the aforesaid process steps and said steps will be repeated for any other selected output; and in the A/P Mode a pointer output will be firstly selected from among those previously chosen in the R/M Mode, and the successive steps will be repeated for any successive, selected pointer output. Said embodiments, therefore, involve the steps of:

A—Choosing one of two Modes, the R/M (REGISTER/MEMORY) Mode or the A/P (ACTIVE/PLAY) Mode;

B—When the pointer is in the R/M Mode: a) selecting a pointer output; b) identifying the beginning of the selected pointer output, c) registering all the pointer events occurring thereafter, d) identifying the end of the selected pointer output, e) ceasing to register any successive pointer events, and e) repeating the above steps for any further, desired pointer outputs;

C—When the pointer is in the A/P Mode: a) selecting a pointer output from among those previously chosen in the R/M Mode, and b) causing the events comprised in the selected pointer output to be repeated.

In normal computer operations, as well as in carrying out this invention, pointer events are generally produced by depressing or/and releasing pointer keys or, in the case events that are displacements, by displacing the pointer in a manner adapted to the particular pointer in use. There are, however, pointer events that occur in the process of the invention and which affect the operation of the pointer and not of the computer and therefore are not transformed to associated computer actions by a transfer operator. Among those pointer events are, generally, the identification of the beginning and of the end of a selected pointer output, the change from one Mode to the other, the selection, in the A/P Mode, of a pointer output from among those previously chosen in the R/M Mode, and others that may be provided by the invention. Such pointer events—as in general all pointer events that are relevant to the invention—may be caused by actuating a key or a combination of keys of the pointer or by actuating pointer keys in combination with a computer keyboard key, or, in some cases, by actuating a computer keyboard key or combination of keys. It should be understood, therefore, that the mention hereinafter of the way in which a pointer event is determined, is not binding, as the most suitable key or combination of keys will be adopted by the skilled person in each case. For example, a combination of two pointer keys may be used for changing from the AP Mode (which may, and in most cases does, automatically eat when the computer is switched on) to the R/M Mode and vice versa; and another such combination may be used for identifying the beginning and the end of a pointer output. However, if desired, either the switch from the A/P to the R/M Mode and vice versa, or the identification of the beginning and of the end of a pointer output, or both, may be effected by means of a key or combination of keys of the computer keyboard or combination of such keys with pointer keys. Actuating the keyboard keys will then produce codes having the same effect as if the codes were produced by pointer events.

The invention also provides pointer controlled computer apparatus, which comprises:

I—a pointer device, comprising means for transmitting to a computer signals corresponding to all occurring pointer events;

II—means for identifying the beginning and the end of a pointer output;

III—a computer, programmed to apply a corresponding transfer operator to all computer outputs;

III—means for registering and memorizing the pointer output;

IV—means for retrieving the pointer output; and

V—means for causing the computer, when desired, to apply to any registered and memorized pointer output the corresponding transfer operator.

By "retrieving the pointer output" is mean herein transmitting to the computer software the codes and messages, which constitute the output, as if they originated directly from the pointer.

In embodiments of the invention, the apparatus will further comprise means for means for registering and memorizing a plurality of pointer outputs, means for selecting any desired pointer output, among said plurality, for registering and memorizing, and means for selecting any registered and memorized pointer output to be retrieved.

The apparatus ordinarily operates in overwrite manner, viz. if a first pointer output has been memorized in a memory bank comprised in the aforesaid means for registering and memorizing the selected pointer outputs, and the same registering and memorizing operations are repeated with reference to a second, different output, the second output replaces the first, which is canceled from said memory bank. In this way, the memorized and reproduced pointer outputs can be varied at will, according to the requirements of the moment.

Further, the outputs memorized in the memory bank comprised in the aforesaid means for registering and memorizing the selected pointer outputs may be canceled when the computer is switched off, thus clearing all the memory means for future operation, or they may be retained in spite of the switching off.

The hardware of the apparatus according to the invention may be the same as described and claimed in PCT/IL96/00078; particularly, it may be the hardware according to any embodiment of PCT/IL96/00078. The means and actions for producing pointer events, described in said PCT application, are generally applicable to the present invention.

If a single pointer output is to be registered and then repeated, it is, so to speak, automatically selected both in the R/M and in the A/P Mode, viz. its registration and repetition may be. started by actuating a key or combination of keys, and it may be that the same key or combination of keys may start registration or repetition, depending on whether the apparatus is in the R/M or in the A/P Mode. However, if any one of a plurality of pointer outputs is to be registered and then repeated when desired, an actual selection between different outputs must be carried out in both Modes and the selected memory bank or banks must be addressed in each case. This can be. done in various ways, readily carried into practice by skilled persons. For instance, a rouse or keyboard key or combination of keys may be associated to each output, and each such key or combination of keys will cause the pointer to convey digital information to the appropriate key or combination of keys and to retrieve information therefor. Alternatively, an output selector may be provided and the different outputs may be identified, e.g., by numerals. The selector may be a key that switches from memory bank or banks at each successive actuation, a different identifying numeral being displayed each time in any convenient way, e.g., in a pointer window. The selector may be a rotatable button, carrying different numerals about its periphery and associated with a reference index, which button switches from one memory bank or combination of banks to another as it is rotated from one angular position to another. The selector may comprise a transistor or a transistor circuit. Al these and other switching means are per se conventional and need not be particularly described.

BRIEF DESCRIPTION OF THE DRAWINGS

In the drawings:

FIGS. 1 and 1a schematically illustrate the pointer events and the associated actions of one embodiment of the process according to the invention, FIG. 1 referring to the R/M Mode and FIG. 1a to the A/P Mode;

FIGS. 2 and 2a are analogous to FIGS. 1 and 1a, but refer to another embodiment of the process:

DETAILED DESCRIPTION OF PREFERRED EMBODIMENTS

The following, non-binding Examples illustrate two typical embodiments of this invention. The Examples describe the memorization of only one pointer output, and therefore do not comprise a selector for selecting a desired output from a plurality thereof, but the extension of what is described to a plurality of outputs is obvious, it being sufficient that the apparatus be provided with a plurality of memory banks and with selector means for switching between them.

Example 1

Figure 1:
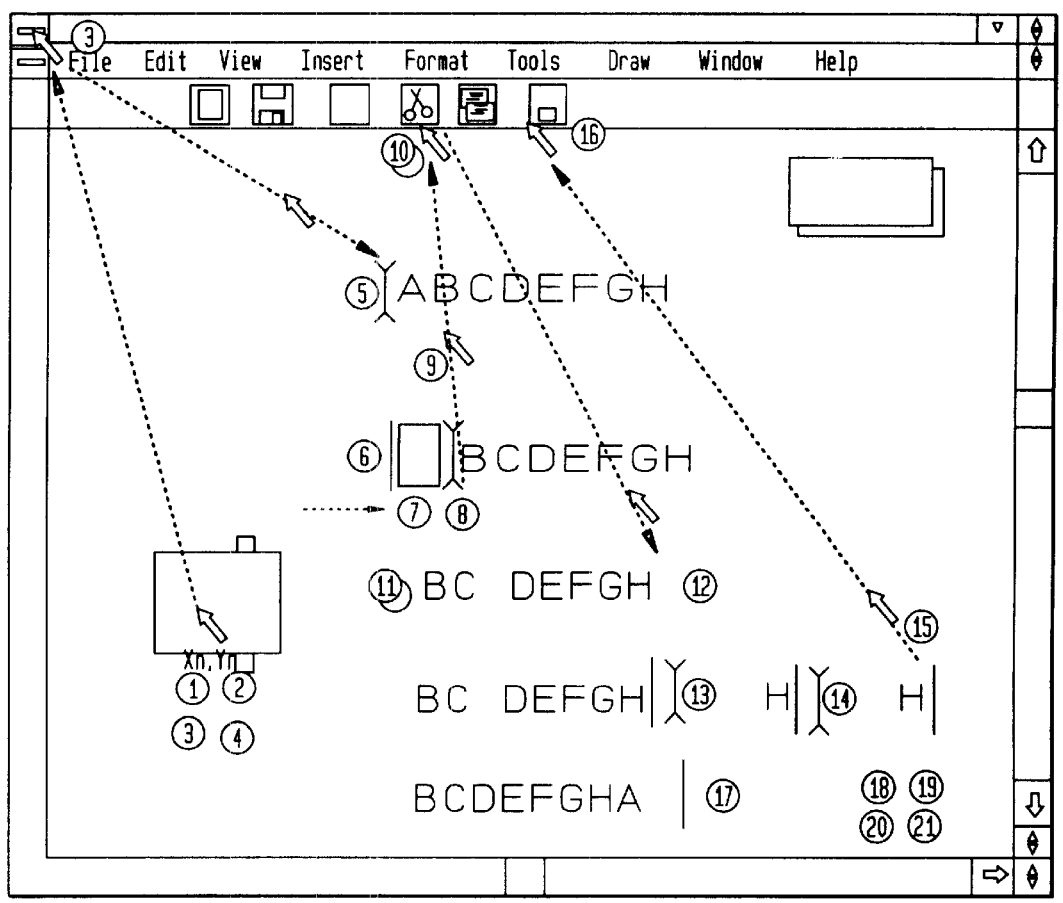

In this Example, the transfer, by means of a pointer which is a mouse, of a graphic entity from a position on the computer screen to another is illustrated (with reference to FIG. 1 for the R/M Mode and to FIG. 1a for the A/P Mode) by showing how letters, which have been printed in a certain succession, can be displaced, over the screen so as to undergo a permutation, changing and even totally inverting their order. The operations described would permit to displace graphic entities also other than letters and to effect displacements that are different and/or have for other purposes and by means of a pointer other than a mouse. The process of this example is illustrated by the succession of mouse events and the corresponding associated (computer) actions or program responses determined by the Transfer Operator. It should be noted that in all the stages of the process the letters ABCDEFGH occupy together they same area of the screen, though, for purposes of illustration, they are shown in different areas of the drawing sheet.

In the following tables, the progressive numerals in the first (left-hand side) column indicate the order in which the pointer (mouse) events and program responses follow one another, and the numerals, in parentheses, in the second column identify each event, whenever it occurs. Thus, e.g., the event Middle Button Up is identified by (2") whenever it occurs, and in this Example it occurs for the first time as the fourth event.

FIG. 1

| Mouse Events | Associated Program Response |
|---|---|
| 1 (1') Middle Button Down | 0 |
| 2 (2') Right Button Down | 0 |
| 3 (1") Right Button Up | 0 |
| 4 (2") Middle Button Up | 0 |

Event 1 causes the arrow shaped pointer index to move to the original point (e.g., in this example, the upper left corner of the screen) regardless of what might be the location of the pointer index (Xn,Yn) before the event occurs. Although this movement of the pointer index is visible, it does not depend on the-program currently being used (PowerPoint in this example). Therefore the Associate Program Response is zero.

The sequence of mouse events from 1 to 4 causes all mouse events occurring afterwards to be registered. (R/M Mode On). This sequence too results in a zero Program Response.

| Mouse Events | Associated Program Response |
|---|---|
| 5 (3) MouseMove | The arrow-shaped pointer index changes into a I-beam-shaped pointer index. |

The pointer index is brought to the location of the text where the editing to begin. The arrow-shaped pointer index changes into a I-beam-shaped pointer index, since the presence of a text has been recognized by the program.

| Mouse Events | Associated Program Response |
|---|---|
| 6 (4') Left Button Down | A vertical line, called insertion point, appears next to the I-beam shaped pointer index, signifying that the text may now be edited. |
| (5) DragOver | The desired portion of text is selected (blackened). |
| 8 (4') Left Button Up | Selection of text ends. |
| 9 (3) MouseMove | The I-beam-shaped pointer index changes into an arrow-shaped pointer index, as it leaves the text area. |
| 10 (4') Left Button Down | The Cut tool is selected (clicked). |
| 11 (4") Left Button Up | The selected text is cut and copied to the clipboard. The remaining text shifts to. the left. |
| 12 (3) MouseMove | The arrow-shaped pointer index changes into a I-beam shaped pointer index as it recognizes a text. |
| 13 (4') Left Button Down | The insertion point appears next to the I-beam shaped pointer index, signifying that the text may now be edited. |
| 14 (4") Left Button Up | The insertion point starts blinking, prompting for a test editing action. |
| 15 (3) MouseMove | The I-beam-shaped pointer index changes into an arrow-shaped pointer index, as it leaves the text area |
| 16 (4') Left Button Down | The Paste tool is selected (clicked) |
| 17 (4") Left Button Up | The selected text is pasted from the clipboard left of the blinking insertion point. |

FIG. 1a

| Mouse Events | Associated Program Response |
|---|---|
| 18 (1') Middle Button Down | 0 |
| 19 (2') Right Button Down | 0 |
| 20 (2") Right Button Up | 0 |
| 21 (1") Middle Button Up | 0 |

The Middle+Right Button combination sequence (as for events 1 to 4), in the example, operates in toggle Mode. Thus, this time, the sequence of events from 18 to 20 causes the mouse to stop recording mouse events. (R/M Mode Off)

FIG. 1a

| Mouse Events | Associated Program Response |
|---|---|
| 22 (1') Middle Button Down | 0 |
| 23 (4') Left Button Down | 0 |
| 24 (4") Left Button Up | 0 |
| 25 (1") Middle Button Up | 0 |

The Middle+Left Button combination sequence (events 22 to 25) causes all previously recorded mouse events (50–17) to be replayed (A/P Mode).

Figure 1A:
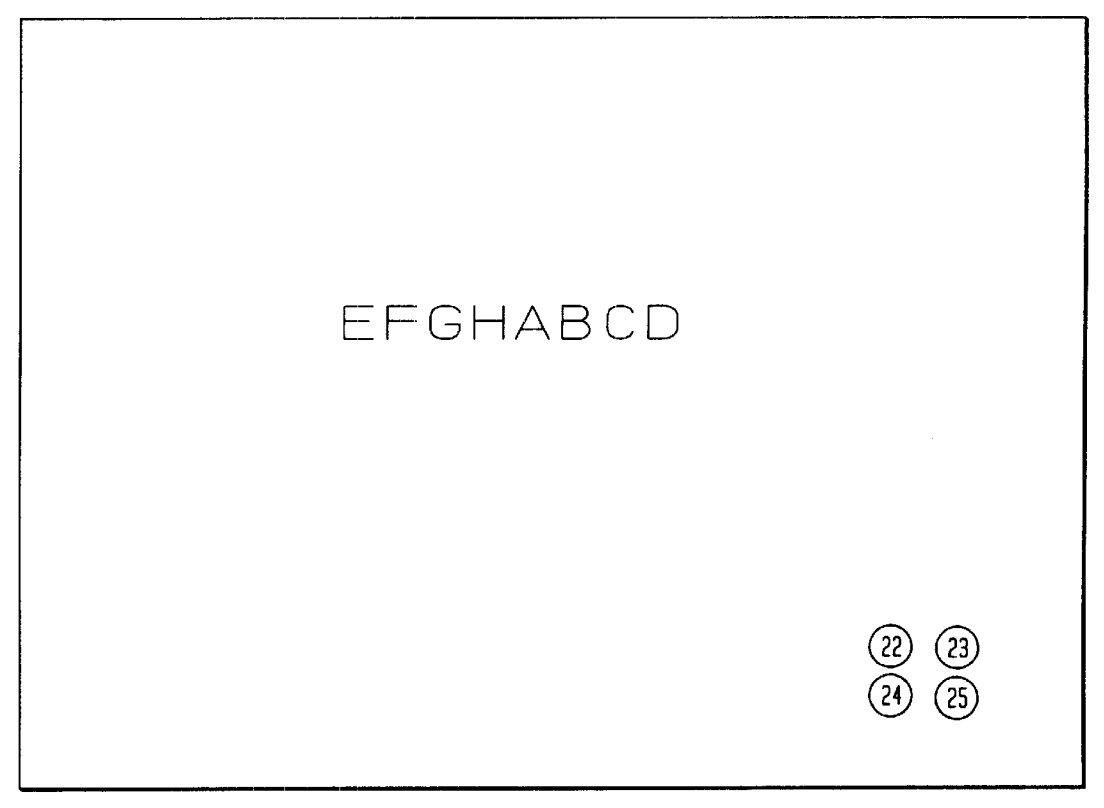

FIG. 1a shows the result of the A/P Mode after it is used three times on the text in the example. It could have been used any number of times.

As already noted, in spite of the fact that for graphical reasons the edited text is shown in different sections of the page, it must be considered as fixed in one place.

Example 2

Figure 2:
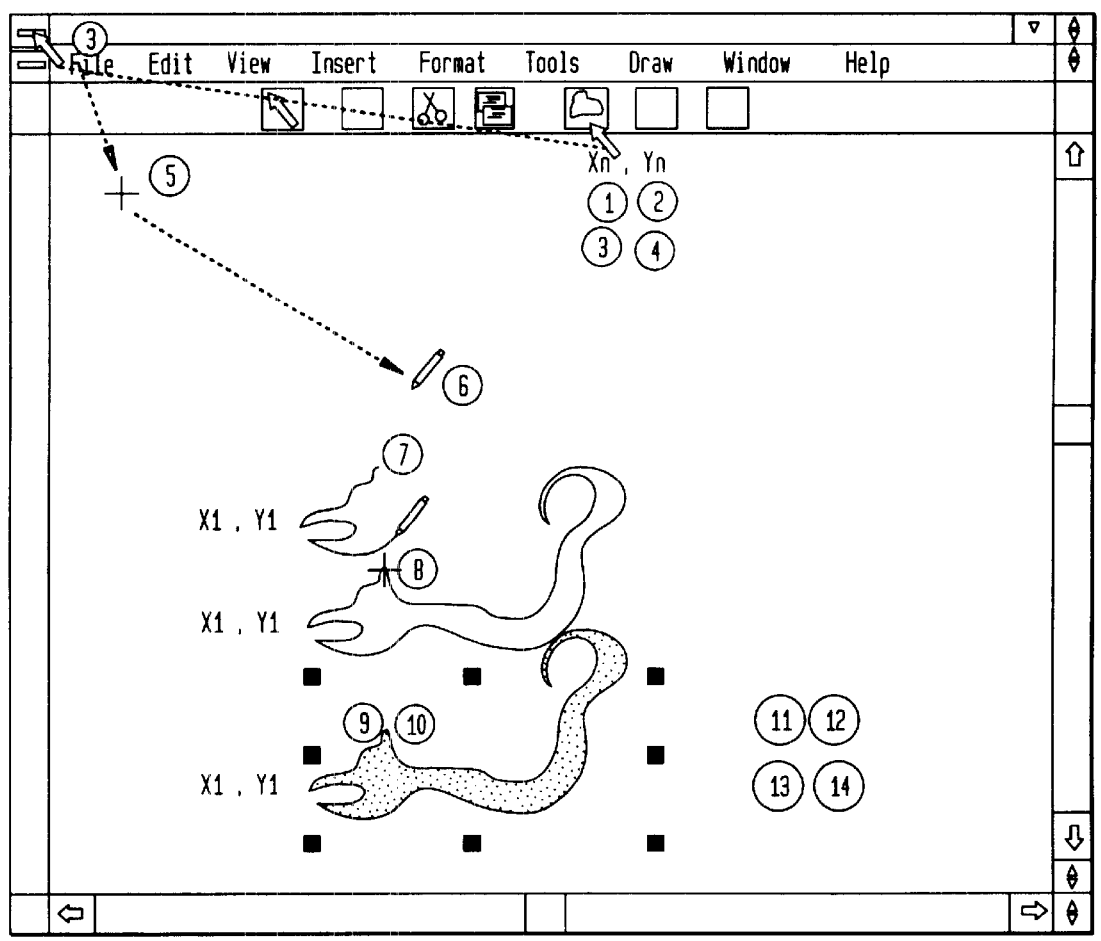

In this Example, an embodiment is illustrated which comprises the drawing and reproducing of a design—an arbitrary figure having no particular significance and no fixed position on the screen. The actions that take place in the R/M Mode are shown in FIG. 2 and those that take place in the A/P Mode in FIG. 2a. It will be appreciated that this Example is in fact quite general and illustrates how to draw, reproduce and displace any graphic shape and could be carried out by means of a pointer other than a mouse.

FIG. 2

| Mouse Events | Associated Program Response |
|---|---|
| 1 (1') Middle Button Down | 0 |
| 2 (2') Right Button Down | 0 |
| 3 (1") Right Button Up | 0 |
| 4 (2") Middle Button Up | 0 |

Event 1 causes the arrow-shaped pointer index to move to the origin point (e.g., the upper left corner of the screen, in the example) regardless of what might be the location of the pointer index (Xn,Yn) before these mouse events occur. Although this movement of the pointer index is visible, it does not depend on the program currently being used (PowerPoint in this example). Therefore, the Associated Program Response, at this point, is zero.

The sequence of events from 1 to 4 causes all mouse events occurring afterwards to be registered (R/M Mode On). This sequence too results in a zero Associated Program Response.

| Mouse Events | Associated Program Response |
|---|---|
| 5 (3) MouseMove | The arrow-shaped pointer index changes into a cross-shaped pointer index as it enters the drawing area, signifying that the Drawing Mode is enabled. The pointer index is brought to the location where the drawing is to begin. |
| 6 (4') Left Button Down | The cross-shaped pointer index changes into a pencil-shaped pointer index, signifying that the Drawing Mode is now on. |
| 7 (5) DrawOver | The desired shape is drawn by making visible the path defined by the pointer index. |
| 8 (4") Left Button Up | The pencil-shaped pointer index changes into a cross-shaped pointer index. Drawing Mode is off. |
| 9 (4') Left Button Down | The drawn shape is filled with the currently selected color. The cross-shaped pointer index changes into an arrow-shaped pointer index, signifying that the Drawing Mode has been disabled The drawn shape appears in Select Mode. |
| 10 (4") Left Button Up | 0 |

| Mouse Events | Associated Program Response |
|---|---|
| 11 (1') Middle Button Down | 0 |
| 12 (2') Right Button Down | 0 |
| 13 (2") Right Button Up | 0 |
| 14 (1") Middle Button Up | 0 |

The Middle+Right Button combination, in the Example, operates in toggle Mode. Thus, this time, the sequence of events from 11 to 14 causes the mouse to stop recording mouse events (R/M Mode Off).

while, for purposes of illustration, the various stages of the drawing are shown in different zones of the figure, they are in fact in the same location on the screen, the initial point of which has the coordinates X1,Y1.

FIG. 2a

| Mouse Events | Associated Program Response |
|---|---|
| 15 (1') Middle Button Down | 0 |
| 16 (4') Left Button Down | 0 |
| 17 (4") Left Button Up | 0 |
| 18 (1") Middle Button Up | 0 |

The Middle+Left Button combination sequence (15–18, causes all previously recorded mouse events (5–10) to be replayed (A/P Mode).

Note that, Hike in Example 1, the task (the drawing of the shape) can be optionally reproduced from any location chosen by the user. Thus, the section of the drawing which corresponds to coordinates (X1, Y1) when the shape is originally drawn in R/M Mode, can be reproduced at any other desired location, e.g., (X2, Y2). This is achieved by reproducing only mouse events which follow and include the first Left Button Down event after the R/M Mode is on. In other words, events from 1 to 4 are, in this case, discarded. In order to choose this option—which may be called "Relative Replay Mode", as opposed to the "Absolute Replay Mode" used in Example 1)—an additional command must be given in conjunction with the A/P Mode. Such a command may consist, for example, of a Command Key, of any other key or of an additional Mouse Button combination.

As already stated, the hardware of the apparatus according to the invention may be the same as described and claimed in any embodiment of PCT/IL96/00078. According to one such apparatus embodiment, an interface is provided between the pointer (mouse) and the computer, which sits on the bus slots of the computer. This embodiment is schematically illustrated in the block diagram of FIG. 3. Numeral 20 indicates the mouse, which is the pointer assumed, for purposes of illustration, to be used in this embodiment. The mouse, in this embodiment, is a serial device and sends signals in sequential manner, as indicated at 21. Yet, the invention applies to any kind of pointing device and any other kind of mouse (e.g. a bus mouse) could have been used in this embodiment. Numeral 22 indicates a Universal Asynchronous Receiver/Transmitter (UART), which is connected to the bus 23 of the reference computer. For simplicity of illustration, it will be assumed, in describing this and the following embodiments, that the computer is an IBM PC or a clone thereof Clearly, however, the invention could be applied to other computers, with adaptations, if any are needed, that would be well within the ability of a skilled person. Numeral 24 generally illustrates the interface that is inserted, according to the invention, between the mouse and the computer. This comprises a Microcontroller Unit (MCU) 25, a Memory 26, a Serial Communication Interface (SCI) 27 and a Serial Peripheral Interface (SPI) 28. The Memory contains the MCU routine, as well as a Memory Buffer.

Such an interface can be added, e.g., to the Motorola HCMOS 8-bit Single-Chip Microcontroller (MC68HC11) based evaluation board by using an IBM-PC standard Prototype Card Diagram (available in BIOS Technical Manuals) and wiring the interface on its prototype extension, to be connected to the IBM-PC bus. The resulting circuit provides:

512 bytes of internal EEPROM (block protect),
512 bytes of internal RAM (saved on standby or retained by low current backup source),
Timer System,
SCI,
SPI,
Real Time Interrupt Circuit,
Low Power Mode.

Figure 3:
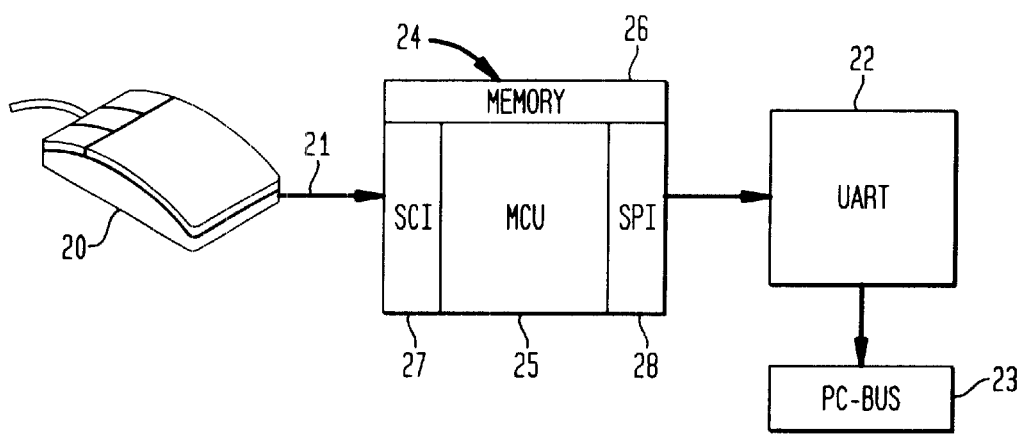
FIG. 3 illustrates in block diagram form one embodiment of the apparatus according to the invention.
Figure 4:
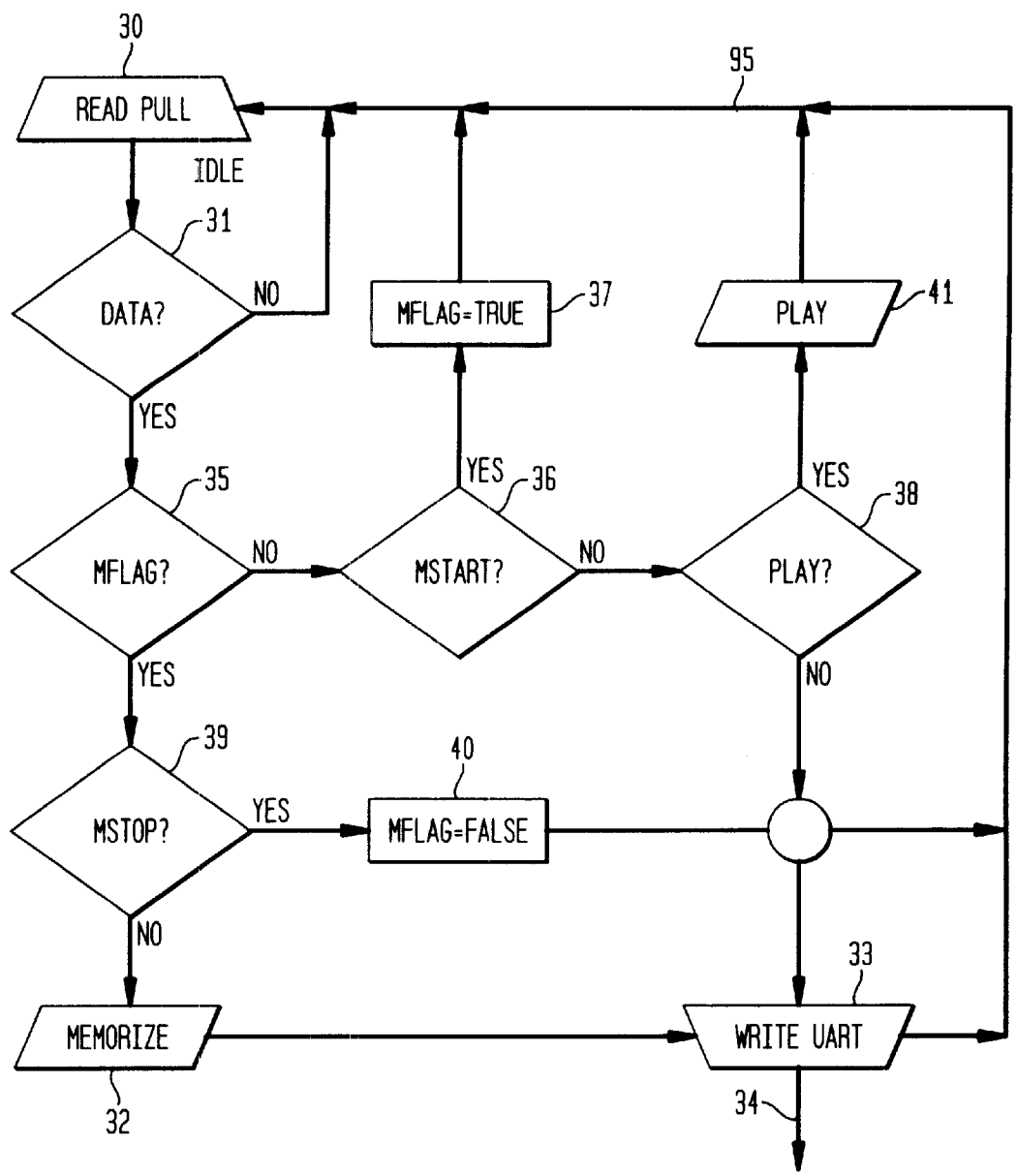
FIGS. 4 and 5 schematically illustrate the operations carried out by the apparatus of FIG. 3, in the R/M and in the A/P Mode respectively.

The Microcontroller Unit (MCU) of FIG. 3 carries out the operations that are schematically described in the block diagram of FIG. 4. The serial input from the mouse is indicated at 30. The device continuously operates in idle condition, until at is found, as indicated at 31, that an input datum has been received. The input data consist of bytes corresponding to different mouse events. All mouse events—whether, e.g., the clicking of a button or a displacement of the mouse or any other—are sent and received in the same way. As a matter of fact, even the commands which the MCU receives from the mouse to start or stop memorizing, or the command to let the data pass through to the UART, are mouse events. In other words, any input received from the mouse, regardless of its effects and of the way in which it is processed, is always a mouse event. If an input datum has been received, it is checked, as shown at 35, whether the system is in the R/M Mode, this fact having entered in an appropriate memory bank. If the answer is positive, it is checked, as shown at 39, whether the datum is a command to stop registering the data. If it is not such a command, the datum is memorized, as shown at 32, and is concurrently transmitted to the UART 33 and from it to the computer, as shown at 34, so that the same datum, while being memorized, is processed as in the normal mouse activity. Then the described cycle is repeated. If it is found, at 39, that the datum is a command to stop registering the data, it is carried out at 40, and the described cycle is repeated.

If it is found at 35 that the system is not in the R/M Mode, it is checked at 36 whether the datum is not a command to shift to the R/M Mode. If it is such a command, it is carried out at 37, and the described cycle is repeated. If at 36 it is found that the datum is not a command to shift to the R/M Mode, it is verified at 38 that the system is indeed in the A/P Mode, and if so, the A/P process is activated, as symbolically indicated at 41 and as more filly illustrated hereinafter in the block diagram of FIG. 9. If at 38 it is found that no command has been given to carry out any particular operation, the datum from the mouse is transmitted to the UART to be processed, as in conventional operation, after which the cycle described begins anew.

Figure 5:
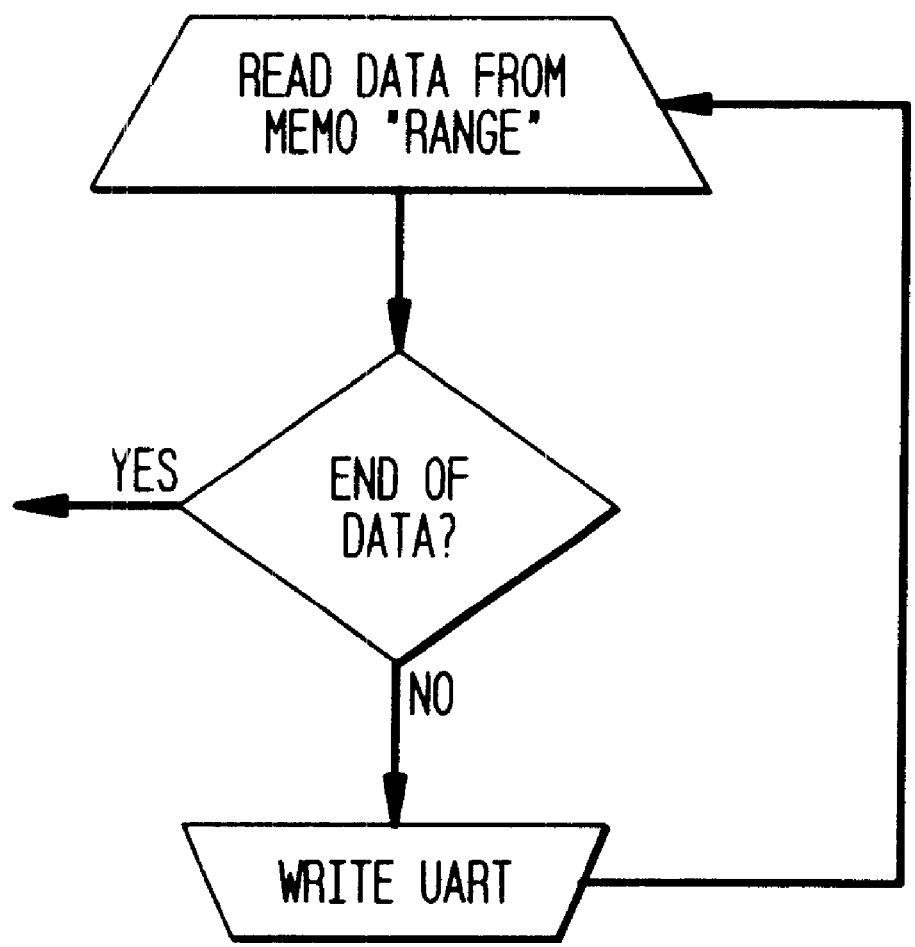

If the A/P process is activated, the operations indicated in FIG. 5 take place. Each datum received at 31. in FIG. 4 is read. It is checked if the datum is a signal that no more data will be received, and in this case the loop starting at 30 in FIG. 4 is restarted, as shown at 95 in said figure. If the datum is not such a signal, it is transferred to the UART 33 of FIG. 4, though by a connection not shown in said figure.

while examples of the invention have been given by way of illustration, it will be apparent that many modifications, variations and adaptations may be made therein by persons skilled in the art, without departing from the spirit of the invention or exceeding the scope of the claims.

What is claimed is:

1. Process for recording and reproducing computer pointer outputs and/or events, which comprises the steps of:

A-Choosing one of two Modes, the R/M (REGISTER/MEMORY) Mode or the A/P (ACTIVE/PLAY) Mode;

B-When the pointer is in the R/M Mode: a) identifying the beginning of a pointer output, b) registering all the pointer events occurring thereafter, c) identifying the end of the pointer output, and d) ceasing to register any successive pointer events; and C-When the pointer is in the A/P mode, causing the events comprised in the selected pointer output to be repeated, whereby identifying the beginning of the pointer output, registering all the pointer events, identifying the end of the pointer output and ceasing to register any successive pointer events take place without regard to a time interval between the pointer events.

2. Process according to claim 1, which comprises the steps of:

A-Choosing one of two Modes, the R/M (REGISTER/MEMORY) Mode or the A/P (ACTIVE/PLAY) Mode;

B-When the pointer is in the R/M Mode: a) selecting a pointer output; b) identifying the beginning of the selected pointer output, c) registering all the pointer events occurring thereafter, c) identifying the end of the selected pointer output, d) ceasing to register any successive pointer events, and e) repeating the above steps for any further, desired pointer outputs;

C-When the pointer is in the A/P Mode: a) selecting a pointer output from among those previously chosen in the R/M Mode, and b) causing the events comprised in the selected pointer output to be repeated.

3. Process according to claim 2, wherein the selection of the desired pointer outputs is generated by the actuation of key or combination of keys chosen from among pointer keys and computer keyboard keys.

4. Process according to claim 1, further comprising applying the same transfer operator to the pointer events and outputs repeated in the A/P Mode and to the pointer events and outputs generated in the R/M Mode.

5. Process according to claim 1, wherein the pointer output associated with the change from the A/P Mode to the R/M Mode and the pointer output associated with the change from the R/M Mode to the A/P Mode are generated by the actuation of a pointer key or a combination of two pointer keys.

6. Process according to claim 1, wherein the pointer output associated with the identification of the beginning and of the end of a pointer output is generated by the actuation of a pointer key or a combination of at least one pointer key.

7. Process according to claim 1, wherein at least one pointer event comprised in a pointer output associated with the change from the A/P Mode to the R/M Mode and the pointer output associated with the change from the R/M Mode to the A/P Mode, or with the identification of the beginning and of the end of the pointer output, is generated by the actuation of at least a computer keyboard key.

8. Apparatus for recording and reproducing computer pointer outputs and events, which comprises:

a pointer device, comprising means for transmitting to a computer signals corresponding to all occurring pointer events;

means for identifying the beginning and the end of a pointer output;

a computer, programmed to apply a corresponding transfer operator to all computer outputs;

means for registering and memorizing the pointer output;

means for retrieving the pointer output; and means for causing the computer, when desired, to apply to any registered and memorized pointer output the corresponding transfer operator, whereby the means for identifying and the means for registering and memorizing operate without regard to a time interval between pointer outputs.

9. Apparatus according to claim 8, further comprising:

means for registering and memorizing a plurality of pointer outputs without regard to the time interval between the pointer outputs;

means for selecting any desired pointer output for registering and memorizing; and means for selecting any registered and memorized pointer output to be retrieved.

10. Apparatus according to claim 9, wherein the means for registering and memorizing the plurality of pointer outputs comprises distinct memory banks for memorizing different pointer outputs, and which further comprises selector means for selecting the pointer output which is to be memorized or to which the corresponding transfer operator is to be applied.

* * * * *

UNITED STATES PATENT AND TRADEMARK OFFICE
CERTIFICATE OF CORRECTION

PATENT NO. : 6,452,606 B1
DATED : September 17, 2002
INVENTOR(S) : Marco Luzzatto, Theodor Morel Fishler and Salomone Antebi It is certified that error appears in the above-identified patent and that said Letters Patent is hereby corrected as shown below:

Column 1,
Line 35, "fist," should read -- first --.

Column 2,
Line 4, "be, made" should read -- be made --.

Column 3,
Line 33, after "permit" delete "to so".
Line 59, "oily" should read -- only --.
Line 62, "tube" should read -- the --.

Column 4,
Line 20, "e" should read -- one --.
Line 50, after "occurred" insert -- . --.
Line 54, after "itself" insert -- , --.

Column 5,
Line 60, "eat" should read -- exist --.

Column 6,
Line 20, "is mean" should read -- it is meant --.
Line 55, "be. started" should read -- be started --.
Line 63, "be. done" should read -- be done --.
Line 64, "rouse" should read -- mouse --.

Column 7,
Line 13, "Al" should read -- All --.
Line 60, "they" should read -- the --.

Column 8,
Line 32, "a" should read -- an --.
Line 36, "editing to" should read -- editing is to --.
Line 37, "a" should read -- an --.
Line 55, "a" should read -- an --.

UNITED STATES PATENT AND TRADEMARK OFFICE
CERTIFICATE OF CORRECTION

PATENT NO. : 6,452,606 B1
DATED : September 17, 2002
INVENTOR(S) : Marco Luzzatto, Theodor Morel Fishler and Salomone Antebi It is certified that error appears in the above-identified patent and that said Letters Patent is hereby corrected as shown below:

Column 9,
Line 27, "50" should read -- 5 --.

Column 10,
Line 39, "while" should read -- While --.
Line 57, "Hike" should read -- unlike --.

Column 11,
Line 23, "thereof Clearly" should read -- thereof.  Clearly --.
Line 52, "until at" should read -- until it --.

Column 12,
Line 28, "while" should read -- While --.
Line 58, "c) identifying" should read -- d) identifying --.
Line 59, "d) ceasing" should read -- e) ceasing --.
Line 60, "e) repeating" should read -- f) repeating --.

Signed and Sealed this

Eleventh Day of February, 2003

JAMES E. ROGAN
*Director of the United States Patent and Trademark Office*